United States Patent Office 3,175,022
Patented Mar. 23, 1965

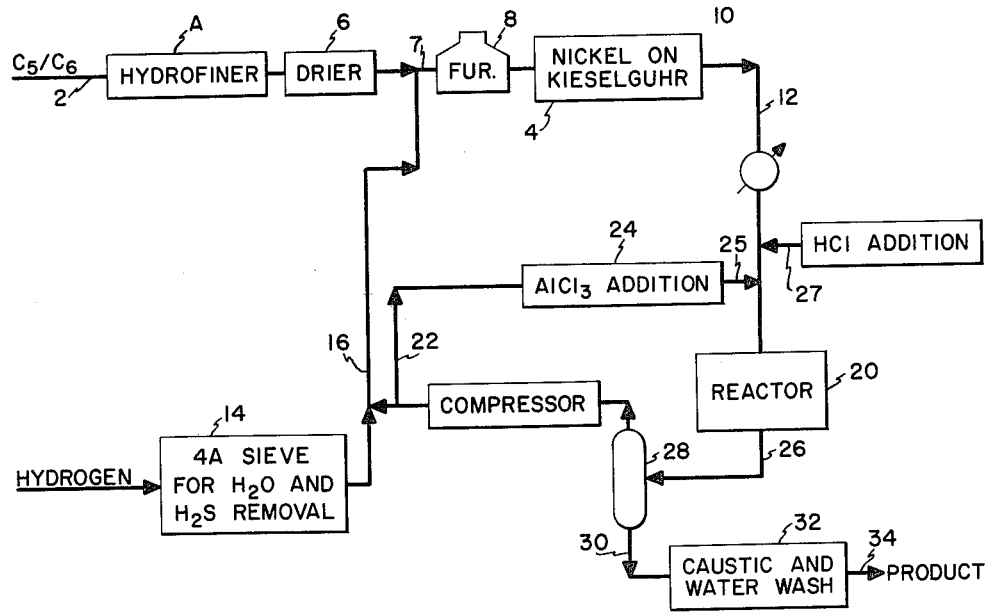
FIG. I
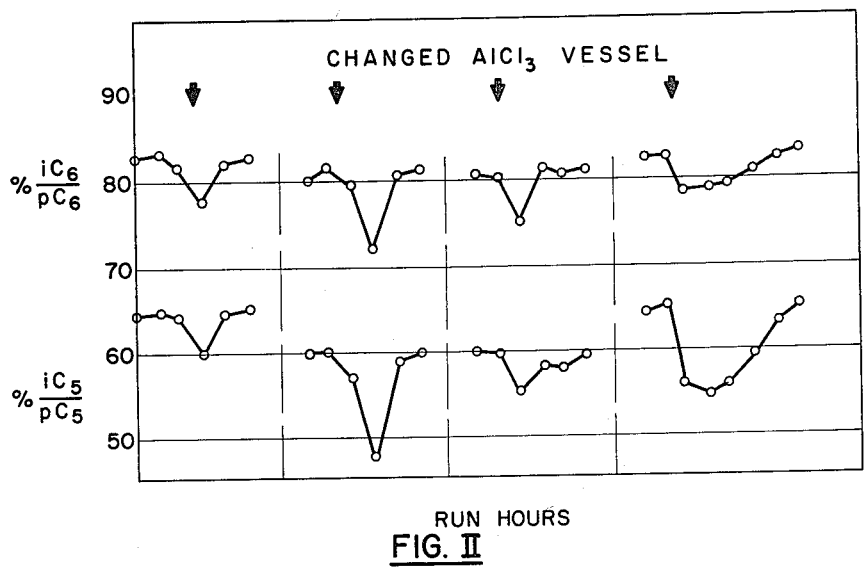
FIG. II

3,175,022
CATALYST AND PROCESS FOR LOW TEMPERATURE PARAFFIN HYDROISOMERIZATION
Arthur Lewis Reitemeier, Summit, N.J., and Adam Le Roy Sommers and Alfred Douglas Reichle, Baton Rouge, La., assignors to Esso Research and Engineering Company, a corporation of Delaware
Filed Dec. 20, 1961, Ser. No. 160,709
18 Claims. (Cl. 260—683.75)

The present invention relates to the isomerization of isomerizable organic compounds, and more particularly concerns the isomerization of $C_5$ and/or $C_6$ paraffin hydrocarbon streams, which also may contain naphthenes, in the presence of hydrogen and a supported noble metal catalyst containing aluminum chloride. More specifically, the present invention relates to a superior support for this reaction and to processing conditions and sequence resulting in high catalyst activity and life. The invention is based on the discovery that a remarkably improved isomerization process is possible by critically controlling the method of manufacture of the support, its composition, and the operating modifications introduced by use of the support.

At the present time, refining interests are particularly concerned with methods to improve the octane number of light virgin naphtha constituents not susceptible to octane improvement by existing refinery operations such as catalytic cracking and reforming. Isomerization has been considered of particular interest for up-grading such light naphtha constituents, and considerable effort has been directed to the development of a practical isomerization process.

Catalytic agents suggested for this purpose have particularly included metal halides such as aluminum chloride activated by hydrogen chloride. While such catalytic systems have good potentials for isomerization, particular problems are encountered—particularly as concerns their tolerance for the presence of aromatic hydrocarbons in the isomerization feed. Another catalyst system which has been considered is a catalyst of the reforming type constituting platinum on alumina promoted with small amounts of halogen, in view of the aromatic tolerance of such catalysts.

Use of platinum on alumina catalysts for paraffin hydroisomerization has particularly been developed in connection with relatively high temperature operations. Temperatures in the reforming range of about 600° to 900° F. have particularly been explored using a hydrogen atmosphere of about 3500 to 10,000 standard cubic feet per barrel. The catalyst in such operations has included about 0.1 to 1.0% of platinum supported on activated alumina, and including about .1 to 1% of halogen or somewhat more. An active hydroisomerization catalyst for these conditions can be prepared by chloroplatinic acid impregnation of activated alumina, in which the catalyst retains the chlorine originally introduced with the chloroplatinic acid.

It has previously been suggested to carry out platinum hydroisomerization at temperatures of about 200° to 400° F. The advantage in use of such low temperatures is based on thermodynamic considerations going to the extent of conversion which is feasible. Thus, the thermodynamic equilibrium between iso- and normal pentane at 800° F. is only 0.6 mole fraction of isopentane. On the other hand, at lower temperatures, the thermodynamic equilibrium is favorably affected to enable greater conversion of normal to isoparaffin. Thus, at 300° F., the mole ratio of isoparaffin to normal paraffin at thermodynamic equilibrium is about 0.8 mole fraction.

Particular problems are encountered in providing a practical low temperature platinum hydroisomerization process. Platinum catalysts of the type used in high temperature hydroisomerization are not satisfactory, having insufficient activity for use at the lower temperatures. The inclusion of a Friedel-Crafts component in the catalyst substantially enhances the activity of the catalyst, but this has not always resulted in a catalyst of high activity and long life. Another problem encountered is the extreme sensitivity to feed impurities in low temperature platinum hydroisomerization.

The present invention concerns a catalyst composition having critical features in its preparation and composition, which when combined with certain critical operating features, results in a hydroisomerization process of outstanding effectiveness. The present invention further concerns a combination of critical features employed in conjunction with the support of the invention.

In brief compass, it has been found that the support must be prepared in a manner to be completely free of common contaminants, in particular sodium ions and sulfate ions, and preferably also iron, chromium, vanadium and similar cations; it has further been found that this support must be impregnated initially with $AlCl_3$ in a critical, narrow range. The amount of $AlCl_3$ is dependent upon the surface area of the $Pt-Al_2O_3$ catalyst. For a base having a surface area of about 195 $M^2/g$. the critical amount of $AlCl_3$ is within the range of 4.8 to 6.2 wt. percent, preferably 5.2 to 5.4 wt. percent; for a $Pt-Al_2O_3$ catalyst having a surface area of 170 $M^2/g$. the critical amount of $AlCl_3$ is within the range of 4.0 to 5.0 wt. percent, preferably 4.4 to 4.6 wt. percent. The critical $AlCl_3$ content for an alumina free of sulfate and sodium ions is given by the relation, (Surface area in $M^2/g$.)$(0.028) = AlCl_3$ content $\pm 0.8$ wt. percent The need for such critical control is shown by the data below wherein a suitable base was impregnated with varying amounts of $AlCl_3$ and then tested for activity and selectivity. The data show that excess $AlCl_3$ reduces the selectivity and insufficient $AlCl_3$ does not produce a catalyst with high activity for isomerization.

Range of $AlCl_3$ on Catalyst

[Batch Autoclave Test: 175 ml. autoclave, 50 ml. n-pentane + 0.1 vol. % CC14, 10 ml. of 0.6% Pt on $Al_2O_3$, 400 p.s.i.g. (autoclave pressured with sufficient $H_2$ at room temp. to attain 400 p.s.i.g. at 300° F.), 30 min. heating time + 45 min. at 300° F. Catalyst surface area 196 $M^2/g$.]

| Product Composition | | $AlCl_3$ Content of Catalyst, Wt. Percent |
|---|---|---|
| Percent i-$C_5$/p-$C_5$ | Percent $C_4$- | |
| 72.3 | 10.3 | 7.8 |
| 71 | 6.2 | 6.6 |
| 71.6 | 2.6 | a {6.1 |
| 73.6 | 2.6 | 5.8 |
| 71.3 | 2.2 | 5.3 |
| 70.4 | 1.9 | 5.2 |
| 68.3 | 2.6 | 3.9 |
| 48.0 | Trace | 3.0 | a Critical range.

It has further been found that, surprisingly, with the support of the present invention containing a critical amount of $AlCl_3$, it is important to add $AlCl_3$ continuously during the reaction, even though having initially more AlCl$_3$ present than in the critical amounts is deleterious to the reaction.

The catalyst employed in the hydroisomerization reaction is a platinum or palladium catalyst supported on the alumina-aluminum chloride composition. Preferably, the catalyst embodies about 0.3–0.6 wt. percent of platinum. This catalyst is particularly effective for paraffin hydroisomerization at temperatures of about 200° to 400° F., pressures of 700 to 1500 p.s.i.g. and employing about 300 to 2,000 s.c.f. H$_2$/barrel of feed. Furthermore, a substantial portion of the hydrocarbon feed is maintained in the liquid phase, at least about 20%.

Other features of the process of the present invention concern the necessity for extreme feed purification to eliminate substantially oxygen, nitrogen, water and sulfur compounds from the feed and the addition of hydrogen chloride promoter in amounts of about 25 to 500 parts per million, based on feed.

The process of the present invention will be further understood from a description of the accompanying drawings illustrating features of the invention, as well as the illustrative examples.

Referring now to FIGURE I, the paraffinic feed to be isomerized, comprising a C$_5$ and/or C$_6$ paraffinic hydrocarbon is passed through line 2 to a feed pretreatment zone 4. Because of the high susceptibility to poisoning of the catalyst, it is preferred to employ a two-stage pretreatment operation. Vessel 4 may be a conventional hydrofiner where sulfur and nitrogen impurities are decreased to a low level by hydrogenation at about 200 to 400 p.s.i.g. and 550° F. with a cobalt-molybdate catalyst. The effluent is dried in vessel 6 in the presence of a conventional adsorbent such as SiO$_2$, Al$_2$O$_3$, AlCl$_3$ or a zeolitic molecular sieve.

The dried paraffin feed is then passed via line 7 to furnace 8 to hydrotreater 10. Also passed to this unit is a hydrogen, or hydrogen-rich gas stream which may have had an initial purification treat by passage through suitable means in vessel 14 to remove water and H$_2$S. Al$_2$O$_3$ or 4A molecular sieves are suitable. Unit 10 contains a supported nickel catalyst; suitable is one containing about 30 to 70 weight percent nickel on a kieselguhr support. Any residual sulfur is reacted with the nickel to form nickel sulfide. This chamber is preferably operated vapor phase at hydroisomerization pressure, which preferably is about 750 p.s.i.g., temperature of about 450° F., a feed rate of 4 to 10 v./v./hr. and about 900 c.f. H$_2$/barrel of feed. The purified feed is then passed through line 12 to hydroisomerization reactor 20.

Reactor 20 is filled with the platinum hydroisomerization catalyst prepared in the manner described more fully below. The process is preferably operated at throughputs of about 1 to 3 v./v./hr. Temperatures maintained within vessel 20 are preferably 250° to 350° F., preferably about 315° to 335° F. Pressures are about 300 to 1000 p.s.i.g., preferably 650 to 850 p.s.i.g. A hydrogen feed of about 500 to 1000 s.c.f./b. is employed, this hydrogen being supplied both as fresh hydrogen and recycle hydrogen. The latter stream is introduced through lines 25 and 12, and is the means whereby AlCl$_3$ is continuously introduced with the reaction vessel 20. About 50 to 200 p.p.m. AlCl$_3$, preferably 100 p.p.m. AlCl$_3$, is thus introduced. For an active catalytic system of the present invention, there is required a catalyst having AlCl$_3$ bonded to the support and also AlCl$_3$ not so bonded. Furthermore hydrogen chloride is also continuously added to the system through line 27; preferably 50 to 200 p.p.m. of HCl are thus passed into vessel 20. About one-half of the HCl present in 20 may come from the recycle gas stream and one-half is added continuously. Reactor concentration of HCl preferred is about 100 p.p.m. HCl on feed.

Isomerization reaction products are withdrawn through line 26, hydrogen and light gases separated in gas liquid separator 28, product caustic washed in unit 32 and the product withdrawn from the system through line 34.

In accordance with the present invention, the AlCl$_3$ content of the catalyst (total) is maintained within the critical range of AlCl$_3$, based on Al$_2$O$_3$+platinum. If there is more than this amount of AlCl$_3$ on the support, both selectivity and activity decrease. Furthermore, the catalyst support must be substantially free of sulfate ions, sodium ions, and iron.

The nature of this invention, and its advantages, are shown by the following examples:

EXAMPLE 1

A series of synthetic aluminas for use as catalyst base material were prepared by a variety of methods. These included (1) formation of alumina gels by addition of NH$_4$OH, (NH$_4$)$_2$CO$_3$, etc. to aluminum salts such as AlCl$_3$, Al$_2$(SO$_4$)$_3$, Al(NO$_3$)$_3$ and the like to form Al(OH)$_3$, which were converted to Al$_2$O$_3$.XH$_2$O by drying and calcination; (2) reaction of NaAlO$_2$ with an acidic reagent to form Al(OH)$_3$ gel, then calcined; (3) reaction of Al(metal) with HCl to form a sol, which was then gelled by reaction with NaOH, followed by washing, drying, and calcination; (4) from alcoholate alumina by precipitation with acetic acid. These were impregnated with Pt and AlCl$_3$ and compared in activity in isomerizing a normal pentane fraction.

Aluminum metal, freshly cleaned of the oxide coating, is converted into an alumina sol by solution in methyl alcohol (free of any Na$^+$, SO$_4$$^=$ or other impurities now found to be detrimental). The sol is precipitated with acetic acid (also free of these contaminants) and dried. The alumina is converted to gamma alumina having a large surface area, impregnated with either platinum or palladium and carefully recalcined to retain the surface area. Immediately following calcination, the catalyst is preferably reduced and impregnated with AlX$_3$. Should it be necessary to store the catalyst after calcination or reduction, additional drying and reduction are necessary before impregnation for reduction and/or elimination of water absorbed in storage. Impregnation with AlX$_3$ should be in a manner similar to that given in the following example:

Following recalcination after platinum impregnation, the high purity platinum-alumina is reduced and then placed in a suitable heated container and maintained at a temperature of 365° to 950° F. (184° to 510° C.) while 10 to 40 wt. percent AlCl$_3$ is vaporized and passed through the catalyst bed. The AlCl$_3$ may be in an inert carrier gas such as nitrogen or hydrogen. Following AlCl$_3$ impregnation, the catalyst should be stripped of excess AlCl$_3$ for 1.5 to 3.0 hours if the amount of AlCl$_3$ exceeded 15 to 20 wt. percent at 750° F. impregnation temperature or if the impregnation temperature was below 750° F.; if the impregnation temperature was 750° F. or greater and if the amount of AlCl$_3$ was 15 to 20 wt. percent, the stripping time can be as low as 40 minutes. Retention of excess AlCl$_3$ reduces initial catalyst activity and selectivity. Highly active and selective catalysts contain 4 to 6 wt. percent AlCl$_3$, preferably about 5 to 6 wt. percent for a base having a surface area of 195 M$^2$/g.

In summary, it has been found that the highest activity for a catalyst useful in low temperature isomerization has the following properties:

| Property: | Value |
|---|---|
| Surface area | 160–260 M$^2$/g. |
| Pore volume | 0.4–0.6 cc./g. |
| Na$^+$ | None. |
| SO$_4$$^=$ | None. |
| Fe, V, Cr, Ni, etc. | None. |
| SiO$_2$ | <0.5 wt. percent, preferably none. |
| Cl$^-$ (Br)$^-$ | 4–6 wt. percent (10–15 wt. percent). |
| Pt (Pd) | 0.1–1.0 weight percent (0.1 to 2.0 wt. percent). |

EXAMPLE 2

A series of catalyst supports were tested for their suitability for use in the catalytic hydroisomerization of paraffin hydrocarbons. These were all commercially available aluminas available from different manufacturers and prepared in the general manner described in Example 1, with the exception of Catalyst G, which was prepared in a manner described in a recent U.S. patent. The preparation of the latter is given below:

A gamma-alumina was prepared by the general method of dissolving aluminum pellets in hydrochloric acid to form a sol containing 15% alumina. Hydrofluoric acid was added to the sol so that the final composite contained 0.375% fluorine by weight based on dry alumina. The resulting solution was mixed with hexamethylene tetraamine in a continuous mixer and dropped into an oil bath at about 90° C. to form spheres. The spheres were aged in oil, and then in an aqueous solution of ammonia (1–2 hours). The washed spheres were then transferred to a drier, dried at about 250° C. and calcined at about 600° C.

The eight catalyst bases were then impregnated with chloroplatinic acid to a platinum content of 0.6 wt. percent and impregnated as described above with aluminum chloride. The catalysts were then compared in a standard autoclave activity test: 50 cc. of n-pentane, 0.1 cc. of $CCl_4$ activator and 6 grams of catalyst were placed in an autoclave and pressured to 115 p.s.i.g. with $H_2$ at 78° F. Following 30 minutes warm-up, the autoclave was held at 300° F. reaction temperature for 45 minutes.

degradation is not as pronounced, but is still noticeable, as shown below:

*Effect of adding $Na^+$ to the catalyst during manufacture*

[Spray dried alcoholate alumina was redissolved and Na as $Na_2CO_3$ was added. After impregnation with 0.6 wt. percent platinum, the catalyst was prepared in normal manner and given a standard autoclave test.]

| Sodium Content, Wt. percent | | Activity, percent $i-C_5/p-C_5$ |
|---|---|---|
| Added to Catalyst | By Analysis | |
| 0.0 | 0.16 | 55 |
| 0.1 | 0.33 | 32 |
| 0.2 | 0.65 | 29 |

The effect of the presence of sulfate ions in the catalyst activity and selectivity is shown by the data below.

| Sulfate Added, Wt. Percent | Sulfate Source | Activity, Percent $i-C_5/p-C_5$ | Selectivity, Percent $C_4^-$ and $C_6^+$ |
|---|---|---|---|
| 0.8 | $Al_2(SO_4)_3$ | 67 | 4.8 |
| 0.6 | $H_2SO_4$ | 59 | 11.5 |
| .075 | (.5 ml./100 ml. $H_2O$) $(NH_4)_2SO_4$ | 66 | 6.7 |
| .15 | $(NH_4)_2SO_4$ | 54 | 13.0 |
| .30 | $(NH_4)_2SO_4$ | 43 | 9.1 |
| .42 | $(NH_4)_2SO_4$ | 61 | 7.8 |
| .42 | $(NH_4)_2SO_4$ | 38 | 13.6 |
| .42 | $(NH_4)_2SO_4$ | 42 | 16.2 |
| Standard catalyst without sulfate addition for comparison. | | 70.2 | 2.6 |

*Table I*

PROPERTIES AND ACTIVITIES OF VARIOUS CATALYSTS FOR ISOMERIZATION ALL BASES IMPREGNATED WITH PT AND $AlCl_3$

| Catalyst Base | Surface Area, $M^2/g$. | Pore Volume, CC./g. | $Na^+$, Wt. Percent | Fe, Wt. Percent | $SO_4^=$ Wt. Percent | $SiO_2$, Wt. Percent | $Cl^-$, Wt. Percent | Activity, Percent $i-C_5/p-C_5$ |
|---|---|---|---|---|---|---|---|---|
| A [a] | 196 | 0.50 | 0.0 | .03 | 0.0 | 0.0 | 5–5.2 | 72–74 |
| B | 116 | 0.28 | 0.1 | .08 | 0.1 | 0.2 | 3.4 | 29 |
| C | 261 | 0.39 | 0.1 | .06 | 0.4 | 0.7 | 4.4 | 5 |
| D | 250 | 0.37 | 0.0 | .03 | 0.7 | 0.3 | 3.6 | 4 |
| E | 221 | 0.42 | 0.4 | .02 | 0.1 | 0.0 | 4.5 | 6 |
| F | 142 | 0.24 | 2.6 | | 0.0 | 0.0 | 6.3 | 0 |
| G [b] | 135 | 0.57 | 0.1 | | 0.0 | (2.1) | 3.6 | 13 |
| H | 209 | 0.50 | 0.2 | .06 | 0.0 | 0.1 | | 42 |

[a] Base impurity levels as per this invention, shown for comparison.
[b] Also contains about 0.4 wt. percent F.

The outstanding activity of the pure base (Catalyst A) is clearly evident. It alone was free of sulfate and sodium ions.

The marked effect of sodium ions on the hydroisomerization activity of a supported $Pt/Al_2O_3/AlCl_3$ catalyst is shown in Example 3 below.

EXAMPLE 3

*Effect of sodium content on activity of catalyst A*
*Catalyst base impregnated with $AlCl_3$ and 0.3% Pt*

| $Na^+$, Wt. percent on Catalyst [a] | Activity, percent $i-C_5/p-C_5$ [b] |
|---|---|
| 0.0 | 72–74 |
| 0.09 | 44 |
| 0.16 | 30 |
| 0.28 | 7 |
| 0.53 | ca. 1 |

[a] $Na_2CO_3$ solution mixed with Catalyst A (0.3% Pt), dried and recalcined before $AlCl_3$ impregnation. Tests using NaOH as source of $Na^+$ gave equivalent results.
[b] Standard Autoclave Activity Test.

If the sodium ion is included or added during the manufacture of the catalyst, the effect of catalyst activity The process of the present invention may be subject to many modifications obvious to those skilled in the art. But in all cases, the catalyst support should contain no more than 0.01% sodium as $Na_2O$, 0.01% sulfate ion, 0.1 wt. percent each of iron, nickel, and vanadium. Prior to use the catalyst containing from 0.3 to 0.6% platinum is calcined at about 1000° F., then reduced with hydrogen at about 950° F. to 1000° F. for optimum activity. It should be thoroughly dry prior to $AlCl_3$ impregnation (less than 1.0 wt. percent total $H_2O$).

As to the isomerization process, in some cases selectivity to isomerized product can be increased by adding or including up to 50% or more naphthenes in the feed. Also, from time to time, if a build-up of deposits, coke or heavy hydrocarbon occurs on the catalyst, simple hydrogen treatment at slightly higher than isomerization temperatures restores catalyst activity. This may be simply done by cutting out product from the unit but continuing the hydrogen flow.

The importance of adding $AlCl_3$ continuously in order to maintain catalyst activity at a high level is clearly shown in FIGURE II. These data, obtained in a pilot plant, show that when the $AlCl_3$ vessel is being changed, no $AlCl_3$ is added to the reactor while the $AlCl_3$ vessel is being recharged. The great drop in isomer ratios show the importance of and the need for continuous addition.

What is claimed is:

1. In the process for isomerizing paraffinic hydrocarbons boiling in the $C_5$ and $C_6$ boiling range by contact with an alumina-platinum-aluminum chloride catalyst at a temperature of from about 200° to about 400° F., a pressure of from about 700 to 1500 p.s.i.g. and in the presence of about 300 to 2000 standard cubic feet of hydrogen per barrel of feed, the improvement which comprises employing as a support an alumina prepared in a manner to be substantially completely free of sodium ions and sulfate ions, initially impregnating said pure alumina with a platinum compound and with a critical amount of $AlCl_3$ given by the relationship Surface Area ($M^2$/g.) ×0.028
=$AlCl_3$ content ±0.8 wt. percent thereafter passing said hydrocarbon feed into a hydroisomerization zone containing said supported catalyst, continuously adding aluminum chloride to said hydroisomerization zone, continuously adding HCl to said zone, and maintaining said temperature, pressure and hydrogen concentration at conditions to maintain at least part of the paraffins in the liquid phase.

2. The process of claim 1 wherein said catalyst contains about 4.4 to about 6.2 wt. percent $AlCl_3$.

3. The process of claim 1 wherein 50 to 200 p.p.m. of $AlCl_3$ are continuously added during the hydroisomerization reaction.

4. The process of claim 1 wherein 25 to 500 p.p.m. of hydrogen chloride is continuously added during the hydroisomerization reaction.

5. The process of claim 1 wherein said feed is pretreated to remove substantially all nitrogen, sulfur and oxygen containing impurities.

6. The process of isomerizing a hydrocarbon stream containing a paraffinic hydrocarbon selected from the class consisting of normal pentane and normal hexane which comprises contacting said stream in a hydroisomerization zone with 300 to 1000 standard cubic feet of hydrogen per barrel of feed and with a platinum on alumina catalyst containing about 0.3 to 0.6% platinum and about 4.4 to 6.2% by weight of $AlCl_3$, said alumina having a surface area of about 170 to 195 $M^2$/g. and containing no more than 0.01% sodium calculated as $Na_2O$, no more than 0.01% sulfate impurity and no more than 0.1% by weight of each of iron, nickel and vanadium impurity, continuously passing into said zone 50 to 200 p.p.m. of $AlCl_3$ and 50 to 200 p.p.m. of HCl, maintaining a temperature of about 200° to 400° F. and a pressure of about 700 to 1500 p.s.i.g., and maintaining at least a portion of said feed hydrocarbons in said zone in the liquid phase.

7. The process of claim 6 wherein the alumina has a surface area of about 170 $M^2$/gm.

8. The process of claim 7 wherein said alumina is impregnated with 4.0 to 5.0 wt. percent of $AlCl_3$.

9. The process of claim 6 wherein said alumina has a surface area of about 195 $M^2$/gm.

10. The process of claim 9 wherein said alumina is impregnated with 4.8 to 6.2 wt. percent $AlCl_3$.

11. The process of claim 6 wherein said hydrocarbon feed is pretreated with a nickel on kieselguhr catalyst in the presence of hydrogen to remove contaminants.

12. The process of claim 6 wherein reaction conditions within said hydroisomerization zone include temperatures of 275° to 350° F., pressures of about 750 p.s.i.g., about 750 standard cubic feet of hydrogen per barrel of feed and velocity of 1 to 3 v./v./hr.

13. The process of claim 12 wherein 100 p.p.m. of free $AlCl_3$ and 100 p.p.m. HCl are present in said zone.

14. The process of isomerizing a paraffinic hydrocarbon stream boiling in the $C_5$ and $C_6$ boiling range which comprises contacting said stream in a hydroisomerization zone at a temperature of from about 200 to 400° F., a pressure of from about 700 to 1500 p.s.i.g. and from about 300 to 2000 standard cubic feet of hydrogen per barrel of feed with a catalyst comprising a platinum group metal composited with alumina and $AlCl_3$, said catalyst being substantially free of sodium ions, sulfate ions and iron, and having a surface area of from about 160 to 260 $M^2$/g., the amount of $AlCl_3$ in said catalyst being defined by the relation (surface area in $M^2$/g.) (0.028)=$AlCl_3$ content ±0.8 wt. percent, continuously passing into said hydroisomerization zone 50 to 200 p.p.m. of $AlCl_3$ and 50 to 200 p.p.m. of HCl and maintaining at least a portion of said hydrocarbon stream in said zone in the liquid phase.

15. The process of claim 14 wherein said catalyst contains no more than 0.01 wt. percent sodium calculated as $Na_2O$, no more than 0.01 wt. percent sulfate ions and no more than 0.1% by weight of each of iron, nickel and vanadium and said platinum group metal is platinum.

16. The process of claim 14 wherein said catalyst contains from about 4.0 to 6.2 wt. percent $AlCl_3$ and said platinum group metal is platinum.

17. A process for the isomerization of a paraffinic hydrocarbon stream containing hydrocarbons selected from the class consisting of normal pentanes and normal hexanes which comprises treating the hydrocarbon stream with hydrogen in the presence of a cobalt-molybdate catalyst at elevated temperatures and pressures, then treating with a drying agent, then treating the dried hydrocarbon stream with hydrogen in the presence of a supported nickel catalyst, and thereafter contacting said hydrocarbon stream with about 300 to 2000 standard cubic feet of hydrogen per barrel of feed in a hydroisomerization zone with a platinum on alumina catalyst containing an amount of $AlCl_3$ defined by the relationship (surface area in $M^2$/g.) (0.028)=$AlCl_3$ content ±0.8 wt. percent, said catalyst having a surface area of from about 160 to 260 $M^2$/g. and being substantially free of sodium ions, sulfate ions and iron, continuously passing into said zone 50 to 200 p.p.m. of HCl and 50 to 200 p.p.m. of $AlCl_3$, maintaining a temperature of from about 200 to 400° F. and a pressure of from about 700 to 1500 p.s.i.g. in said zone and maintaining at least a portion of said hydrocarbon stream in said zone in the liquid phase.

18. The process of claim 17 wherein said catalyst has a surface area of from about 170 to 195 $M^2$/g. and contains from about 0.03 to 0.6% platinum, from about 4.4 to 6.2% by weight of $AlCl_3$ and no more than 0.01 wt. percent of each of sodium ions and sulfate ions.

References Cited in the file of this patent

UNITED STATES PATENTS

| | | |
|---|---|---|
| 2,905,736 | Belden | Sept. 22, 1959 |
| 2,924,629 | Donaldson | Feb. 9, 1960 |
| 2,938,062 | Perry | May 24, 1960 |
| 2,972,650 | Burk et al. | Feb. 21, 1961 |
| 3,047,514 | Burk et al. | July 31, 1962 |